(12) United States Patent
Biester et al.

(10) Patent No.: US 10,801,292 B2
(45) Date of Patent: Oct. 13, 2020

(54) BLOWOUT PREVENTER STACK

(71) Applicants: Klaus Biester, Wienhausen (DE); Peter Kunow, Berlin (DE)

(72) Inventors: Klaus Biester, Wienhausen (DE); Peter Kunow, Berlin (DE)

( * ) Notice: Subject to any disclaimer, the term of this patent is extended or adjusted under 35 U.S.C. 154(b) by 34 days.

(21) Appl. No.: 16/329,049

(22) PCT Filed: Aug. 31, 2017

(86) PCT No.: PCT/EP2017/071932
§ 371 (c)(1),
(2) Date: Feb. 27, 2019

(87) PCT Pub. No.: WO2018/041983
PCT Pub. Date: Mar. 8, 2018

(65) Prior Publication Data

US 2019/0218879 A1 Jul. 18, 2019

(30) Foreign Application Priority Data

Aug. 31, 2016 (DE) .......................... 10 2016 216 469

(51) Int. Cl.
*E21B 33/06* (2006.01)
*F03G 1/00* (2006.01)
*E21B 41/00* (2006.01)
*F03D 9/12* (2016.01)

(52) U.S. Cl.
CPC ............. *E21B 33/06* (2013.01); *E21B 41/00* (2013.01); *F03G 1/00* (2013.01); *F03D 9/12* (2016.05)

(58) Field of Classification Search
CPC ...................................... F03G 1/00; F03D 9/12
See application file for complete search history.

(56) References Cited

U.S. PATENT DOCUMENTS

| 3,667,721 A | 6/1972 | Vujasinovic | |
| 5,101,907 A * | 4/1992 | Schultz | E21B 23/04 166/386 |
| 5,318,130 A * | 6/1994 | Manke | E21B 23/04 166/321 |

(Continued)

FOREIGN PATENT DOCUMENTS

| DE | 102013217383 A1 | 3/2015 |
| WO | 02/36933 A1 | 5/2002 |

(Continued)

*Primary Examiner* — Umashankar Venkatesan
(74) *Attorney, Agent, or Firm* — Ware, Fressola, Maguire & Barber LLP

(57) ABSTRACT

The invention relates to a blowout preventer stack having at least one blowout preventer, at least one kinetic energy storage device, at least one hydraulic pump, and at least one hydraulic actuator which is disposed outside the kinetic energy storage device and is connected to the hydraulic pump via a hydraulic line and is mechanically connected to the blowout preventer, wherein the kinetic energy storage device is coupled, or couplable, to the hydraulic pump and the hydraulic pump may be driven by the kinetic energy stored in the kinetic energy storage device in such a manner that in case of need the hydraulic pump will pump hydraulic fluid to the hydraulic actuator and thus actuate the blowout preventer.

18 Claims, 5 Drawing Sheets

(56) References Cited

U.S. PATENT DOCUMENTS

| | | | |
|---|---|---|---|
| 5,575,452 A * | 11/1996 | Whitby | E21B 33/063 |
| | | | 251/1.3 |
| 5,655,745 A | 8/1997 | Morrill | |
| 6,719,042 B2 | 4/2004 | Johnson et al. | |
| 7,300,033 B1 | 11/2007 | Whitby et al. | |
| 8,779,614 B2 * | 7/2014 | Yarnold | E21B 41/0085 |
| | | | 290/54 |
| 9,863,206 B2 * | 1/2018 | Biester | E21B 33/063 |
| 2008/0023917 A1 | 1/2008 | Khandoker | |
| 2014/0131049 A1 * | 5/2014 | Bourgeau | E21B 41/0007 |
| | | | 166/363 |
| 2015/0369004 A1 * | 12/2015 | Biester | G01L 5/0061 |
| | | | 166/250.01 |
| 2016/0102518 A1 | 4/2016 | Araujo et al. | |
| 2017/0067320 A1 * | 3/2017 | Zouhair | E21B 41/00 |
| 2017/0074075 A1 * | 3/2017 | Liess | E21B 17/046 |

FOREIGN PATENT DOCUMENTS

| | | |
|---|---|---|
| WO | 2015/028651 A2 | 3/2015 |
| WO | 2016/022631 A1 | 2/2016 |

* cited by examiner

BLOWOUT PREVENTER STACK

CROSS REFERENCE TO RELATED APPLICATIONS

This application is the U.S. National Stage of International Application Number PCT/EP2017/071932 filed on Aug. 31, 2017, which application claims priority under 35 USC § 119 to German Patent Application No. 10 2016 216 469.4 filed on Aug. 31, 2016. Both applications are hereby incorporated by reference in their entirety.

TECHNICAL FIELD

The invention relates to a blowout preventer stack having at least one blowout preventer, at least one kinetic energy storage device, at least one hydraulic pump, and at least one hydraulic actuator. In addition, the invention relates to an independent energy storage and drive unit.

BACKGROUND OF THE INVENTION

Typically, drill strings consisting of drill pipes are used for deep drilling in order to reach underground deposits of crude oil and/or natural gas. At the end of the drill string, a drill head is provided for crushing and grinding the ground which may be, for example, in the form of a roller-cone bit or a diamond bit (PDC bit). The drill pipes have a clear inner diameter ranging from about 51 mm (2 in) to about 1.22 m (48 in) and lengths typically ranging from about 9.1 m (30 ft) to about 14 m (46 ft). The drill string is composed of a plurality of drill pipes fitted atop of one another. The diameter of the drill pipes of the drill string which are used at any given moment will depend on the respective well depth. The drill pipes are secured to one another by means of joints, such that hundreds of drill pipes need to be coupled to one another in order to reach depths of thousands of metres. A maximum depth of up to about 12,000 m below ground level can thus be achieved. At the entrance orifice of the well, a concrete foundation is cast in order to secure the well. A portion of the drill string protrudes from the well and is connected to a derrick crane, also referred to as an oil derrick, the function of which is to hold the drill string and, if applicable, also to operate it with the aid of, for example, a top drive. When drilling the well, holes of different sizes and depths are drilled, with a casing being inserted into each of them and an annular cylindrical concrete wall being cast in order to secure the well and to hold the drill pipes in place and/or to guide them. In addition, the casings have the function of preventing rock material from falling down into the hole and/or of precluding the ingress of groundwater. A well typically consists of a plurality of casings of different diameters and different lengths. The casing diameters will decrease from smaller depths to greater depths.

When drilling, the drill head generally crushes the rock material underneath. Typically the rock material is pumped from the end of the well along the free annular cylindrical well shaft surrounding the drill pipes all the way up to the entrance orifice of the well, at ground level. For this purpose, a drilling fluid, typically water/oil containing clay and/or barium meal, is pumped at a high operating pressure of up to 2,000 bar (30,000 psi) through the drill pipes and exits at the drill head, pushing the rock material (in an upward direction) to the entrance orifice of the well. The drilling fluid serves for stabilising the well, for cooling and greasing the drill head, for clearing away rock material and for removing the rock material from the end of the well.

Mankind's high demand for crude oil and/or natural gas has led to an increasing necessity to develop deposits located deeper and deeper and/or of difficult access, so that today crude oil and natural gas are typically extracted from deposits located at depths of between 2,000 m and 4,000 m below ground level. In particular, drillings on the bottom of the sea (subsea drillings), carried out from drilling vessels or from offshore drilling platforms/oil rigs, are used to develop new crude oil and/or natural gas deposits. Deep drilling on the bottom of the sea entails greater technical difficulties as compared to deep drilling carried out on land, since the entrance orifice of the well may be as deep down as 4,500 m (15,000 ft) below sea level. At such depths, direct human access is not possible, which is why typically remotely controlled systems are employed. These, however, are prone to failure and their replacement is highly time-consuming. In addition, due to the salinity of the seawater and the increased pressure conditions present at the bottom of the sea, the mechanical parts required for the drilling process are subject to greater wear and tear and will corrode and/or wear down more readily. Although wells are also drilled in freshwater lakes, such drilling is less common than deep drilling on the bottom of the sea; serving primarily for research purposes, it is not aimed at developing resources of crude oil and/or natural gas.

Both drilling and operating a well bear the risk of a blowout, i.e., an uncontrolled ejection of material such as oil, gas, soil, water, rock or other material when, for example, an abrupt change in pressure occurs in the well during drilling or operating activities. This takes place, in particular, in the course of the drilling process, when the drill head hits a deposit of oil and/or gas. In order to prevent a blowout from happening, which has severe ecological impacts and results in a waste of resources, it is regular practice to employ blowout preventers (BOPs).

Blowout preventers (BOPs) are known from prior art and serve for adjusting pressure and for sealing a well in the case of a blowout. Typically, a stack consisting of different blowout preventers is positioned at the entrance orifice of the well, at ground level. Such blowout preventer stacks may have a weight of up to 1000 t and may reach heights of up to about 20 m. As a general rule, blowout preventer stacks are provided with pressure lines capable of exerting pressure on the material in the well or of relieving pressure from the well in order to regulate pressure conditions reigning in the well and thus to permit, for example, controlled well drilling or controlled extraction of oil and/or gas from the well. Various different kinds of blowout preventer stacks are employed during the well drilling process and during the oil production via the well. The blowout preventers (eruption preventing valve arrangements) for the well have an operating period of about 6 months after which they need to undergo checking. To this effect, in the case of deep-sea well drilling, the entire blowout preventer stack needs to be moved from the bottom of the sea to the sea surface. For production purposes, a simpler structure, such as a Christmas tree or production tree, may be employed. Christmas trees have much longer operating periods, extending up to 25 years. The maximum well depth will be determined by the arrangement and the number of blowout preventers in a blowout preventer stack, since one specifically adapted blowout preventer is typically provided in the blowout preventer stack for each pipe diameter used during the drilling of the well.

Blowout preventers can be configured in the form of ram-type blowout preventers or annular blowout preventers. Ram-type blowout preventers typically include two oppositely arranged rams, ram blocks or slide gate valves that are movable against each other. Annular blowout preventers typically include an annular rubber element, which can have a plurality of ring segments, possibly reinforced by metal segments, and which are displaceable in such a manner that their contacting surfaces can form a hermetically sealing closure. Depending on their design, in particular on the type of ram blocks employed, ram-type blowout preventers may be used for severing, sealing or flattening a drill pipe of the drill string extending along the axis of the well into the blowout preventer in order to counteract the pressure of the material flowing upwardly in the well. Typically, several blowout preventers are disposed in the blowout preventer stack, with blowout preventers arranged nearer to the deposit being usually provided to enclose and seal the drill pipes, and blowout preventers disposed farther away from the deposit being provided for severing the drill string and for hermetically sealing the well. Annular blowout preventers can be closed to variable degrees of tightness and may be designed either to hermetically seal off the well as such or to just provide hermetic sealing around a drill pipe. Blowout preventers and accessory blowout preventer stack components are typically operated by means of hydraulic devices. For this purpose, a hydraulic fluid is forced to the blowout preventers using pressure so as to actuate said blowout preventers by displacing or compressing the ram blocks and/or the annular rubber elements in a well-known manner in order, for example, to open or close them.

A typical blowout preventer stack has a wellhead connector that is formed on its end facing toward the well and serves for hermetically enclosing the topmost casing (conductor pipe casing) which protrudes a short distance from the concrete floor of the wellhead, thus connecting the blowout preventer stack to the well. For this purpose, the wellhead connector typically has a greater diameter than the conductor pipe casing and has collet segments disposed around an inner circumference. Once the wellhead connector is positioned on the conductor pipe casing, pressure can be exerted to tightly urge the collet segments against a stack connector located at the end of the conductor pipe casing in order to provide a hermetically sealing closure. In the case of a blowout preventer stack incidence or in the case of a routine servicing replacement, the wellhead connector has to be opened so that the blowout preventer stack can be removed from the well and be replaced by a new blowout preventer stack or, in the case of a production well, by a Christmas tree.

Above the wellhead connector, one or a plurality of pipe ram blowout preventers are installed for respectively sealing off different pipe diameters. Pipe ram blowout preventers have two oppositely arranged ram blocks including recesses that correspond to the diameter of a drill pipe. When a pipe ram blowout preventer is activated, the oppositely arranged ram blocks are moved towards each other until they sealingly enclose a drill pipe with a diameter corresponding to said recess. Depending on the well depth, a varying number of pipe ram blowout preventers may be arranged in a stacked manner.

Above the pipe ram blowout preventers, a shear ram blowout preventer is provided to cut through, or sever, a drill pipe of the drill string. To this effect, the ram blocks of the shear ram blowout preventers have shearing edges which are capable of severing drill pipes in the manner of a pair of scissors. Preferably, the shear ram blowout preventer serves for severing the drill pipe while simultaneously sealing the drill pipe orifice. Normally, however, the sealing capacity of the shear ram blowout preventer is not sufficient, so that often, in addition, an annular blowout preventer is disposed above it. The latter serves as a hermetically sealing closure of the drill pipe orifice and/or of the entire well.

It is followed by another annular blowout preventer which serves for sealing the blowout preventer stack. The upper annular blowout preventer is connected to a lower marine riser package (LMRP).

In the special case of a blowout preventer that is located on the sea bottom, the annular blowout preventer is followed by a riser connector. The latter is designed for sealingly connecting a riser. The riser typically comprises pressure-tight steel pipes providing an interior wherein the drill string and the drilling fluid are conducted. The riser inner diameter is greater than the diameter of the drill string and is typically about 533 mm (21 in).

The lower marine riser package (LMRP) constitutes a further separation plane of the blowout preventer stack in case the riser should need to be separated from the blowout preventer stack. This may be the case, for instance, if the drilling vessel must leave its position, e.g. when an iceberg is drifting towards the drilling vessel. In this case, the well can be sealed by means of the blowout preventer stack. The drilling vessel may leave its position, once the lower marine riser package (LMRP) has been separated, and may, at a later point in time, reconnect the riser to the blowout preventer stack.

The blowout preventer stack must not fail, since on the occasion of a blowout, any failure to seal the well will entail considerable economic and environmental costs. Therefore, blowout preventer stacks are subjected to severe safety requirements, particularly for wells to be drilled on the sea bed. The utilisation of several redundant supply and safety systems is thus indispensable. In addition to the blowout preventers, the blowout preventer stacks therefore include kill lines and choke lines connected to separate lines which are adapted to inject filler material under high pressure into the well and/or into the blowout preventer stack or to reduce the pressure present in the blowout preventer stack by discharging material in order to enable successful sealing of the well even in the case of a complete or partial failure of the blowout preventers.

U.S. Pat. No. 3,667,721 presents a blowout preventer with a sealing member that has an elastic sealing means. A plurality of metallic displacement means can be slid against a spherical inner surface of a housing in order to bring the sealing member into a closure position, said sealing means being arranged against an actuating piston. The sealing means may be circumferentially in contact with the spherical inner surface of the housing to form a seal. Changes in the diameter of components of a drill string may be addressed by the sealing member through a corresponding adjustment of the sealing member.

US 2008/0023917 A1 discloses a seal and a method of manufacturing a seal for a blowout preventer. The seal includes a rigid material insert disposed within an elastomeric body, at least a portion of said insert being selectively de-bonded from the elastomeric body. A release agent, such as silicon, may be applied on the rigid material insert which is de-bonded from the elastomeric body. The method comprises generating a finite element analysis seal model, wherein a strain plot is analysed based on displacement conditions, and wherein subsequently in the finite element analysis at least a portion of the rigid material insert is identified and selectively de-bonded from the elastomeric body. The method further comprises manufacturing said seal which is provided with the rigid material insert and selectively de-bonded from the elastomeric body.

U.S. Pat. No. 6,719,042 B2 discloses an assembly of shear ram blocks for shearing an oil riser pipe. The assembly comprises two movable ram blocks which are respectively slidable along different ram block axes, one ram block having an upper blade and the other having a lower blade. The surfaces of the blades of the ram blocks are in close proximity when the blades for shearing the oil riser pipe are moved towards each other. A sealing system is positioned within a recess formed in the upper surface of the lower blade. The sealing system comprises an elastomeric seal and an actuator for sealing the lower planar surface of the upper blade. The actuator is movable relative to the lower blade to put the elastomeric seal under tension.

U.S. Pat. No. 5,655,745 discloses a lightweight hydraulic blowout preventer including a blowout preventer body, hinge plates and two pairs of ram blocks. The blowout preventer body has openings for guiding a drill pipe and, perpendicularly thereto, two pairs of vertically superposed, opposing guideways, each accommodating a respective pair of ram blocks. Two bonnets are respectively secured to the blowout preventer body by means of a small number of connecting bolts, which are, viewed from the ram block axis, arranged perpendicularly to each other on a uniform radius or along a single line. The bonnets form guideway extensions having each a ram block operating therein. A hydraulic piston of each ram block is enclosed by a metallic sealing ring. The bonnets are arranged on hinge plates. The connecting bolts of the bonnets can be unbolted, thus allowing said bonnets to be pivoted away from the body by means of the hinge plates.

U.S. Pat. No. 7,300,033 B1 discloses a blowout preventer operator locking system comprising a closure member, a piston rod, an operator housing, a piston, a sleeve and a closure rod. One end of the piston rod is coupled to the closure member. The operator housing has one end coupled to a bonnet and a second end coupled to a head. The piston rod extends through the bonnet and into the operator housing where it is connected to the piston which has a body and a flange. The sleeve is helically fixed within a cavity of the piston and can be axially displaced relative to the piston by means of the locking rod, which is rotationally fixed to the head. One end of the closure rod extends through the head and can be operated under water from the outside of the operator housing.

WO 02/36933 A1 discloses a blowout preventer including a closing device and a connecting channel. The closing device can be transversally displaced with regard to the connecting channel by means of a drive device. The closing device comprises two electric motors which can be operated individually or in a synchronized manner, and a self-locking transmission unit. The self-locking transmission unit is drivingly connected to the electric motors.

SUMMARY OF THE INVENTION

It is the object of the invention to provide a blowout preventer stack that ensures improved operating safety.

According to the invention, this object is achieved by proposing a blowout preventer stack including at least one blowout preventer unit which has at least one blowout preventer, at least one kinetic energy storage device, at least one hydraulic pump, and at least one hydraulic actuator. The hydraulic actuator which is disposed outside the kinetic energy storage device and is connected to the hydraulic pump via a hydraulic line and is mechanically connected to the blowout preventer. The kinetic energy storage device is coupled, or couplable, according to the invention, to the hydraulic pump and the hydraulic pump may be driven by the kinetic energy stored in the kinetic energy storage device in such a manner that in case of need the hydraulic pump will pump hydraulic fluid to the hydraulic actuator and thus actuate the blowout preventer.

The blowout preventer stack according to the invention may advantageously drive a hydraulic actuator without requiring therefor any electric energy. This may, in case of need, advantageously provide an emergency safety feature for the blowout preventer stack, in particular when control systems are otherwise disrupted. In the absence of a case of need, the kinetic energy storage device is typically electrically driven. If, in a case of need, such a drive mechanism is not available, the blowout preventer stack according to the invention may, particularly advantageously and without any further input of electric energy, rely on the stored kinetic energy to operate the hydraulic pump. This contributes to an improvement of the operating safety of the blowout preventer according to the invention.

The utilisation of the hydraulic system described herein makes it possible, in addition, to cause the hydraulic actuator to exert a great force while requiring only a small amount of energy input. Without the need for continuous energy supply, forces are thus made available which make it possible to deform or sever a drill pipe of a drill string running through the blowout preventer. The inventive arrangement of the hydraulic actuator outside the kinetic energy storage device lowers its risk of being damaged by the kinetic energy storage device.

A case of need for the blowout preventer stack to be activated is preferably an unexpected change of a blowout preventer stack structure or a predefined type of malfunction of the blowout preventer stack. Therefore, the aim of driving the blowout preventer by means of a hydraulic actuator is that, if a potentially insufficiently secured condition of a blowout preventer protected well occurs, said well can be automatically secured using little energy and no external input signals.

The hydraulic actuator converts hydraulic pressure into mechanical motion. The hydraulic actuator is arranged in such a way that if required, the blowout preventer stack fulfils its protective function, which is to seal, deform, or sever a drill pipe of a drill string passing through said blowout preventer. Accordingly, the kinetic energy storage device is usually not permanently coupled to the hydraulic pump but may be couplable to the hydraulic pump when a case of need, in particular an incident, occurs.

In the following, preferred embodiment variants of the blowout preventer stack according to the invention will be discussed in greater detail.

In a most preferred embodiment, the kinetic energy storage device is mechanically coupled, or couplable, to the hydraulic pump. This may ensure a particularly robust and durable coupling which can typically be serviced more easily than, for example, an electric coupling.

Preferably, the kinetic energy storage device is coupled, or couplable, to the hydraulic pump via a shaft. Such utilisation of a shaft is particularly easy in terms of production and servicing. Further, a shaft may be realised largely without any coupling losses regarding the efficiency of the energy storage device by directly fastening it to the kinetic energy storage device, for example by fastening it along an axis of rotation of a flywheel mass storage device. In one variant of this embodiment, the shaft is coupled to the hydraulic pump either directly or via a gear, such as a wheel gear, in such a manner that a rotation of the shaft drives a pumping mechanism of the hydraulic pump, thus creating pressure for the displacement of the hydraulic fluid.

In an alternative embodiment, the kinetic energy storage device is electrically coupled, or couplable, to the hydraulic pump via an electric line. In a variant of this alternative embodiment, the kinetic energy storage device has at least one magnetic material. In this embodiment, this magnetic material is arranged on the kinetic energy storage device in such a manner that the kinetic energy storage device creates an induced current in the electric line. This induced current is used, in case of need, for driving the hydraulic pump operating the blowout preventer.

In another preferred embodiment, the hydraulic actuator is configured to operate, in case of need, a slide gate valve of the blowout preventer. The slide gate valve is preferably movable along an axis of displacement. Furthermore, the slide gate valve typically has an instrument of the blowout preventer which is configured to interact with the drill pipe of the drill string passing through the blowout preventer in order to prevent, in case of need, any uncontrolled exit of material through the drill string.

In an embodiment, the hydraulic actuator is mechanically coupled to a shear ram of the blowout preventer. In this embodiment, the hydraulic pump is therefore configured use the shear ram to sever the drill pipe of the drill string passing through the blowout preventer. In a variant of this embodiment, the severing of the drill pipe is performed as soon as the coupling between the kinetic energy storage device and the hydraulic pump is established.

In another embodiment, the hydraulic actuator is a hydraulic cylinder. In this embodiment, a piston of the hydraulic cylinder opposed to the pressure of the hydraulic fluid is advantageously selected in such a manner that the pressure exerted on the piston is sufficient to displace the hydraulic cylinder along a cylinder axis. This preferably leads to a movement of the piston, and of an instrument such as a shear ram connected therewith, which is directed towards and against the drill string. In other variants, the movement of the hydraulic actuator leads to the movement of a riser, a kill line and/or a choke line of the blowout preventer stack.

Preferably, the kinetic energy storage device is a flywheel mass storage device which is configured and arranged so as to rotate with high speed. A flywheel mass storage device comprises at least one flywheel mass. The flywheel mass is preferably arranged so as to rotate about an axis of rotation of the flywheel mass storage device. There may also be several kinetic energy storage devices that are configured as flywheel mass storage devices. The flywheel mass may be in the form of a flywheel, a flywheel rod, a flywheel cylinder or the like and is preferably in the form of a flywheel disc. The kinetic energy storage device may also be realised as a motor generator combination and may, as such, absorb, convert, store, and release energy. In particular, the kinetic energy storage device may be configured for energy recuperation. Preferably, the kinetic energy storage device converts stored kinetic energy into electric energy and/or electric energy into kinetic energy. In a preferred configuration, the kinetic energy storage device, such as the flywheel mass storage device, includes one or several different magnetic materials.

A kinetic energy storage device, for example in the form of a flywheel mass storage device, has speeds of rotation of preferably 10,000 to 12,000 revolutions per minute and may reach speeds of rotation of up to 100,000 revolutions per minute. Preferably, the kinetic energy storage devices of the blowout preventer stack will permanently rotate at full speed of rotation in order to be able to permanently provide energy to the blowout preventer equipment or to permanently actuate the blowout preventers. The number of revolutions may be measured by a control unit which is connected to the kinetic energy storage device. The level of the revolution speed permits to determine the energy reserve of the kinetic energy storage device, for example the flywheel mass storage device. In order to reduce or avoid high mechanical stress of the pivot bearings of the kinetic energy storage device, the pivot bearings are preferably magnetic pivot bearings. An eddy current brake for braking the kinetic energy storage devices is envisageable.

In a preferred embodiment, the hydraulic pump and the hydraulic line are arranged outside the kinetic energy storage device. This may reduce the risk of the hydraulic pump and hydraulic line becoming damaged by the kinetic energy storage device. In addition, such separation of the individual components of the blowout preventer stack facilitates the fabrication of said blowout preventer stack since it makes it possible for the individual components to be fabricated separately and subsequently be arranged within the blowout preventer stack.

In yet another preferred embodiment, the blowout preventer stack further has a coupling control unit. The coupling control unit is configured to switch, in case of need, from a decoupled condition, in which the kinetic energy storage device is not coupled to the hydraulic pump, to a coupled condition, in which the kinetic energy storage device is coupled to the hydraulic pump. Such a change between a decoupled condition and a coupled condition is typically triggered by a reception of a case-of-need signal indicating the occurrence of a case of need. The coupling control unit is preferably associated with exactly one kinetic energy storage device and one hydraulic pump respectively couplable thereto. The coupling and/or decoupling is effected, for example, via a corresponding gear, such as a wheel gear or a crank gear. The case-of-need signal may be an electrical signal which, owing to an emergency power supply being present in the blowout preventer stack, may be created and transmitted without the aid of an external power supply.

In one embodiment, the blowout preventer comprises a force and/or position sensor configured to measure force and/or position data and to provide these in the form of a data signal. The force and/or position sensor may be configured for monitoring a condition of the blowout preventer, in particular regarding the presence of a case of need. Changes in a structure of the blowout preventer, for example unexpected position data of a component of the blowout preventer that is provided with the force and/or position sensor, may lead to the detection of said case of need. In a variant of this embodiment, the force and/or position sensor is further configured to transmit the case-of-need signal as a data signal to the coupling control unit. Thus it is possible to provide, in an automated manner, a coupling between the kinetic energy storage device and the hydraulic pump via a measurement of force and/or position data.

The force and/or position sensors may alternatively or additionally be configured to measure a force acting on ram blocks of a ram-type blowout preventer or on annular rubber elements of an annular blowout preventer and/or to measure a position of said ram blocks or annular rubber elements, and to provide a data signal containing said measurement data (force and/or position data) which may be transmitted, via a sensor line, to an energy supply system and/or to a control system of the blowout preventer stack which is connected to the coupling control unit. By means of these measurement data, the control system is capable of specifically controlling the blowout preventer and of adjusting it in such a manner that a good sealing effect may be achieved while causing little wear and tear.

In a further embodiment, the kinetic energy storage device is configured to transmit kinetic energy to other kinetic energy storage devices or receive kinetic energy therefrom. Such transmission of kinetic energy may be realised in kinetic or in electric form. For example, a kinetic energy storage device may generate inductive current through a rotating magnet and said current may be used to drive another kinetic energy storage device. The utilisation of a plurality of kinetic energy storage devices according to this embodiment makes it possible to use all interconnected kinetic energy storage devices as an energy reservoir for operating the blowout preventer and thus the blowout preventer stack. This ensures increased security since a redundant number of energy storage devices are available on site due to which, in the case of a malfunction of some of the kinetic energy storage devices or of a partial or complete disruption of the connection with the energy supply systems of the blowout preventer stack, there is still a possibility of relying on other kinetic energy storage devices to obtain the energy required for operating part, or the entirety, of the blowout preventer stack.

In a particularly preferred embodiment, the blowout preventer stack further includes a control unit configured to detect a presence, or absence, of said case of need and, if required, to trigger an operation of the hydraulic pump by means of the stored kinetic energy. The control unit preferably forms part of the energy supply and control systems of the blowout preventer stack. In another variant, the control unit is part of the coupling control unit. Preferably, the driving action of the hydraulic pump is activated by coupling the kinetic energy storage device to the hydraulic pump.

In one embodiment, the blowout preventer stack according to the invention has at least one further kinetic energy storage device, wherein said further kinetic energy storage device is coupled, or couplable, to the at least one hydraulic pump. In this embodiment, the hydraulic pump may advantageously be driven by at least two kinetic energy storage devices, which is particularly advantageous if, in the occurrence of a case of need one kinetic energy storage device should happen to fail. In a variant of this embodiment, both kinetic energy storage devices may simultaneously drive the hydraulic pump and thus impart particularly high pressure to the hydraulic fluid.

In a preferred embodiment, the at least one blowout preventer is an annular blowout preventer, a pipe ram blowout preventer or a shear ram blowout preventer.

The blowout preventer stack may also include more than one of the above-mentioned blowout preventer stack components. For example, in one embodiment according to the invention, the blowout preventer stack has an upper annular blowout preventer, a riser connector, a lower annular blowout preventer, a shear ram blowout preventer, a pipe ram blowout preventer, and a wellhead connector. This embodiment is particularly preferred for wells drilled at the bottom of the sea, in which the blowout preventer stack is arranged on the sea bed above the well and is connected, via a riser, to a drilling vessel or a drilling platform that is located on the surface of the sea or water surface. In another embodiment, for example to be used on land, the blowout preventer stack may have merely one annular blowout preventer and may be realised without a riser connector. Preferably, all blowout preventer stack components are mechanically and/or electrically operable. The blowout preventer stack components may also, at least partially, be operated kinetically, i.e. using kinetic energy from the kinetic energy storage devices.

In another embodiment of the blowout preventer stack according to the invention, the hydraulic pump is a plunger pump. The plunger pump preferably has an adjustable plunger stroke and thus an adjustable delivery line.

Preferably, a crankshaft of the plunger pump is connected in a direct, mechanical manner, to an output shaft of a kinetic energy storage device.

Preferably, the hydraulic pump has a connecting rod fastened to an eccentric of a crankshaft for operating a plunger of a plunger pump, the degree of eccentricity of the eccentric being adjustable in relation to the axis of rotation of the crankshaft.

The hydraulic pump according to this embodiment has the advantage of making it possible to couple the kinetic energy storage device to the hydraulic pump without, however, the consequence that the mere fact of being coupled will automatically initiate a driving of the blowout preventer. Preferably, the plunger pump is configured to be capable of setting a given amount of hydraulic fluid that is to be pumped through the hydraulic pump via an adjustable degree of eccentricity of the eccentric relative to the axis of rotation of the crankshaft. In a particularly preferred variant, the eccentricity position of the eccentric may be set such that no, or almost no, hydraulic fluid can be pumped to the hydraulic actuator via the hydraulic pump. Preferably, the blowout preventer stack of this embodiment has no coupling control unit, so that a permanent coupling between the kinetic energy storage device and the hydraulic pump is established. The eccentricity position of the eccentric is preferably set via an eccentricity control unit within the hydraulic pump which is connected to a control system of the blowout preventer stack or with the control unit, so that a reaction of the case of need will trigger a change in the eccentricity position such that more hydraulic fluid will be pumped to the hydraulic actuator via the hydraulic pump.

According to a further aspect of the invention the above-mentioned object is achieved by an independent energy storage and drive unit, in particular for a blowout preventer, having at least one kinetic energy storage device, at least one hydraulic pump, and at least one hydraulic actuator. The hydraulic actuator is arranged outside the kinetic energy storage device and is connected to the hydraulic pump via a hydraulic line. The kinetic energy storage device is coupled, or couplable, to the hydraulic pump and the hydraulic pump may be driven by the kinetic energy stored in the kinetic energy storage device in such a manner that in case of need the hydraulic pump will pump hydraulic fluid to the hydraulic actuator.

By using a kinetic energy storage device, the energy storage and drive unit according to the invention can advantageously increase the operating safety of a blowout preventer stack provided with said energy storage and drive unit.

Advantageously, the kinetic energy storage device is mechanically coupled, or couplable, to the hydraulic pump. In a particularly preferred variant of this embodiment, the kinetic energy storage device is coupled, or couplable, to the hydraulic pump via a shaft.

BRIEF DESCRIPTION OF THE DRAWINGS

The invention will now be discussed in greater detail with reference to example embodiments schematically illustrated in the figures. In the figures.

DETAILED DESCRIPTION

Figure 1:
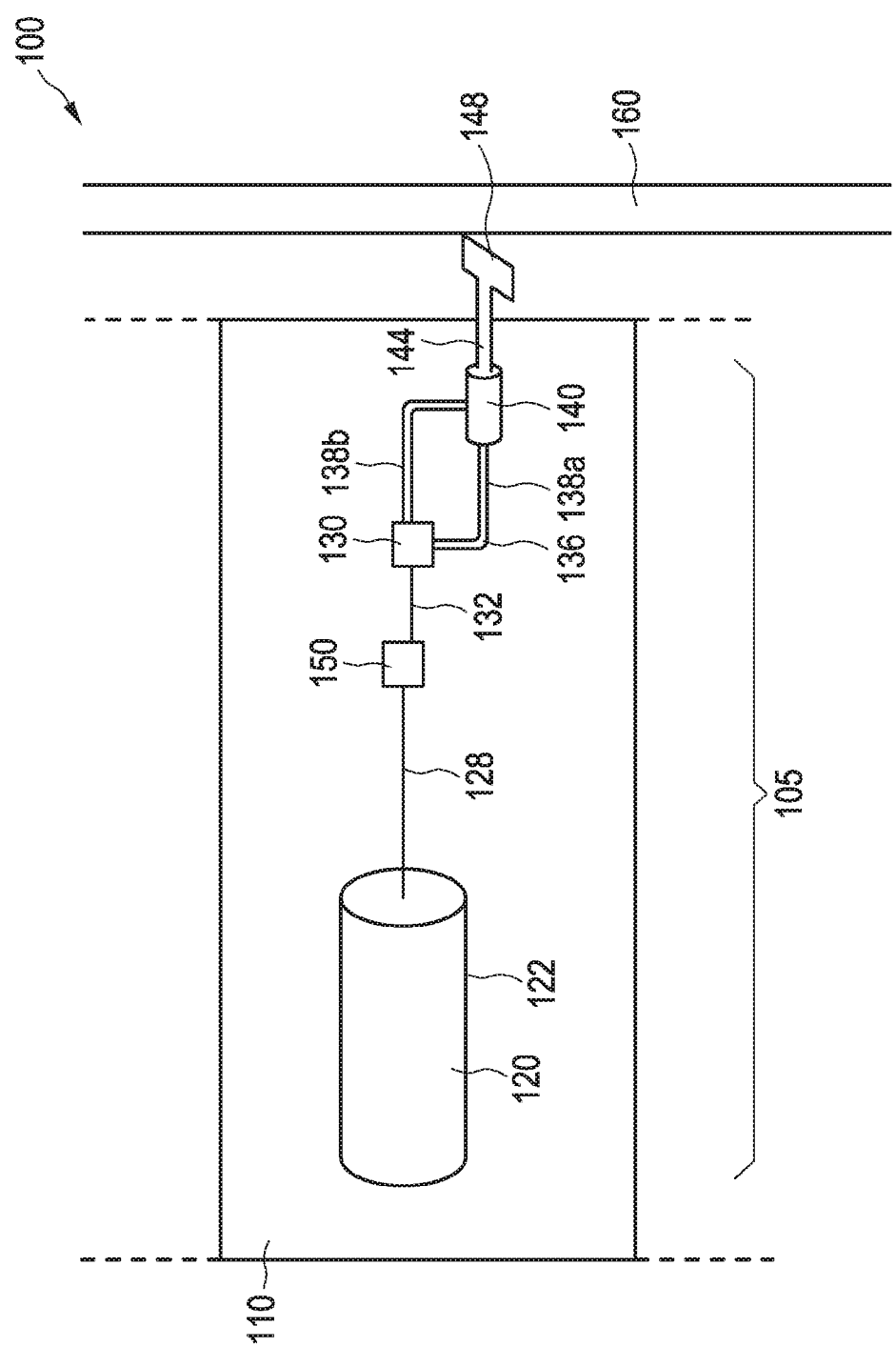
FIG. 1 is a first example embodiment of a blowout preventer stack according to the invention having an independent energy storage and drive unit.

FIG. 1 shows a first example embodiment of a blowout preventer stack 100 according to the invention having an independent energy storage and drive unit 105;

The blowout preventer stack 100 has at least one blowout preventer 110, a kinetic energy storage device 120, a hydraulic pump 130, and a hydraulic actuator 140. The independent energy storage and drive unit 105 is formed by the kinetic energy storage device 120, the hydraulic pump 130, and the hydraulic actuator 140 which is arranged outside the kinetic energy storage device 120 and is connected to the hydraulic pump 130 via hydraulic line 138a, 138b.

The kinetic energy storage device 120 is a flywheel mass storage device that is configured to rotate a flywheel mass 122 of the flywheel mass storage device at a high speed. The flywheel mass storage device is typically driven by an energy supply system of the blowout preventer stack 100 which has been omitted for the sake of clarity. When in operation, the moving flywheel mass 122 makes it possible to use the kinetic energy of the flywheel mass 122 even in the absence of a connection to the energy supply system. Preferably, this is performed via a shaft 128 disposed along an axis of rotation of the kinetic energy storage device.

The shaft 128 connects the kinetic energy storage device 120 indirectly to the hydraulic pump 130. A coupling control unit 150 is connected to the shaft 128 and configured to switch, in case of need, from a decoupled condition, in which the kinetic energy storage device 120 is not coupled to the hydraulic pump 130, to a coupled condition, in which the kinetic energy storage device 120 is coupled to the hydraulic pump 130. The case of need is indicated by a respective case-of-need signal received by the coupling control unit (shown in FIG. 3). When in a coupled condition, the shaft 128 is connected to a second shaft 132 of the hydraulic pump 130 via a coupling control unit 150, for example a wheel gear or a belt gear of said coupling control unit 150. The second shaft 132 is arranged directly on the hydraulic pump 130. Thus, the kinetic energy storage device 120 is coupled, or couplable, to the hydraulic pump 130.

The second shaft 132 can drive the hydraulic pump 130 by rotating about its longitudinal axis and thereby pump a hydraulic fluid 136 through the hydraulic line 138a, 138b and to the hydraulic actuator 140. The hydraulic line 138a, 138b consists of a pump line 138a, into which the hydraulic fluid 136 is pumped by the hydraulic pump 130, and a suction line 138b, through which the pumped hydraulic fluid 136 is returned to the hydraulic pump 130. In this example embodiment, the hydraulic pump 130 has thus a closed circuit of the hydraulic fluid 136. In other non-illustrated example embodiments, the hydraulic pump is operated via an open circuit of the hydraulic fluid, for example with the utilisation of a hydraulic fluid reservoir.

The hydraulic pump 136 is configured in line with a known hydraulic pump design. In the example embodiment, the hydraulic pump 136 is a plunger pump. In non-illustrated example embodiments, the hydraulic pump is a vane pump, a gear pump, or a screw pump.

In this example embodiment, the hydraulic pump 136, the hydraulic lines 138a, 138b, and the hydraulic actuator 140 are arranged outside the kinetic energy storage device 120.

In the example embodiment, the hydraulic actuator 140 is a hydraulic cylinder. Other known hydraulic actuators may equally be used for the blowout preventer stack according to the invention, as long as they convert hydraulic pressure into a movement of a component, preferably into an axial movement of a component of the hydraulic actuator. The hydraulic cylinder shown consists of a piston which is surrounded by a cylinder and is urged along an axial direction relative to the hydraulic cylinder by a pumping force caused by the hydraulic fluid 136. The pressure of the piston moves a slide gate valve 144 of the blowout preventer 110, on which a shear ram 148 of the blowout preventer 110 is mechanically fastened.

Thus, the blowout preventer 110 is driven by the hydraulic pump 130 moving the piston of the hydraulic actuator 140, which is realised as a hydraulic cylinder. This causes the slide gate valve 144 having the shear ram 148 fastened thereon to be moved in an axial direction. Initiated in case of need, this axial movement of the shear ram 148 is intended to sever a drill pipe 160 of a drill string passing through the blowout preventer 110. Thus it is possible to prevent material transported through the drill string from escaping in an uncontrolled manner.

In other embodiments, not shown, a seal or a clamping ram block or another known component for sealing, deforming, or severing the drill pipe is attached to the slide gate valve or directly attached on the hydraulic actuator.

The blowout preventer 110 shown in FIG. 1 is a shear ram blowout preventer. In other example embodiments, the blowout preventer according to the invention is an annular blowout preventer or a pipe ram blowout preventer.

In other embodiments of the blowout preventer stack according to the invention which are not shown, the hydraulic pump is disposed within the kinetic energy storage device, in particular within the flywheel mass energy storage device. This enables a particularly compact design of the blowout preventer stack to be realised.

In the first example embodiment herein, the case-of-need signal is provided by a control unit (not illustrated) which detects the presence of a case of need and subsequently, via the case-of-need signal, automatically causes the hydraulic pump 130 to be driven by the kinetic energy storage device 120. In the first example embodiment, the case of need is detected by means of a force and/or position sensor which is configured to measure force and/or position data at a given spot of the blowout preventer stack and to provide these in the form of a data signal. If the measurement values contained in the force and/or position data deviate from a predetermined value by a predetermined amount, a case of need will be assumed to have occurred. It is assumed, in particular, that in this condition, there is a risk of material escaping in an uncontrolled manner via the drill pipe 160, such that a data signal is transmitted to the control unit from which the control unit detects that currently a case of need has occurred. As a consequence, the driving of the blowout preventer (110) is initiated and the drill pipe 160 is severed using the shear ram 148.

For securing the drill string formed by the drill pipe 160, the blowout preventer stack 100 typically includes other parts, such that in the present example embodiment it has, in addition to the shear ram blowout preventer partly illustrated in FIG. 1, an upper annular blowout preventer, a riser connector, a lower annular blowout preventer, a pipe ram blowout preventer, and a wellhead connector. The typical form of these parts of the blowout preventer stack according to the first example embodiment is commonly known.

Figure 2:
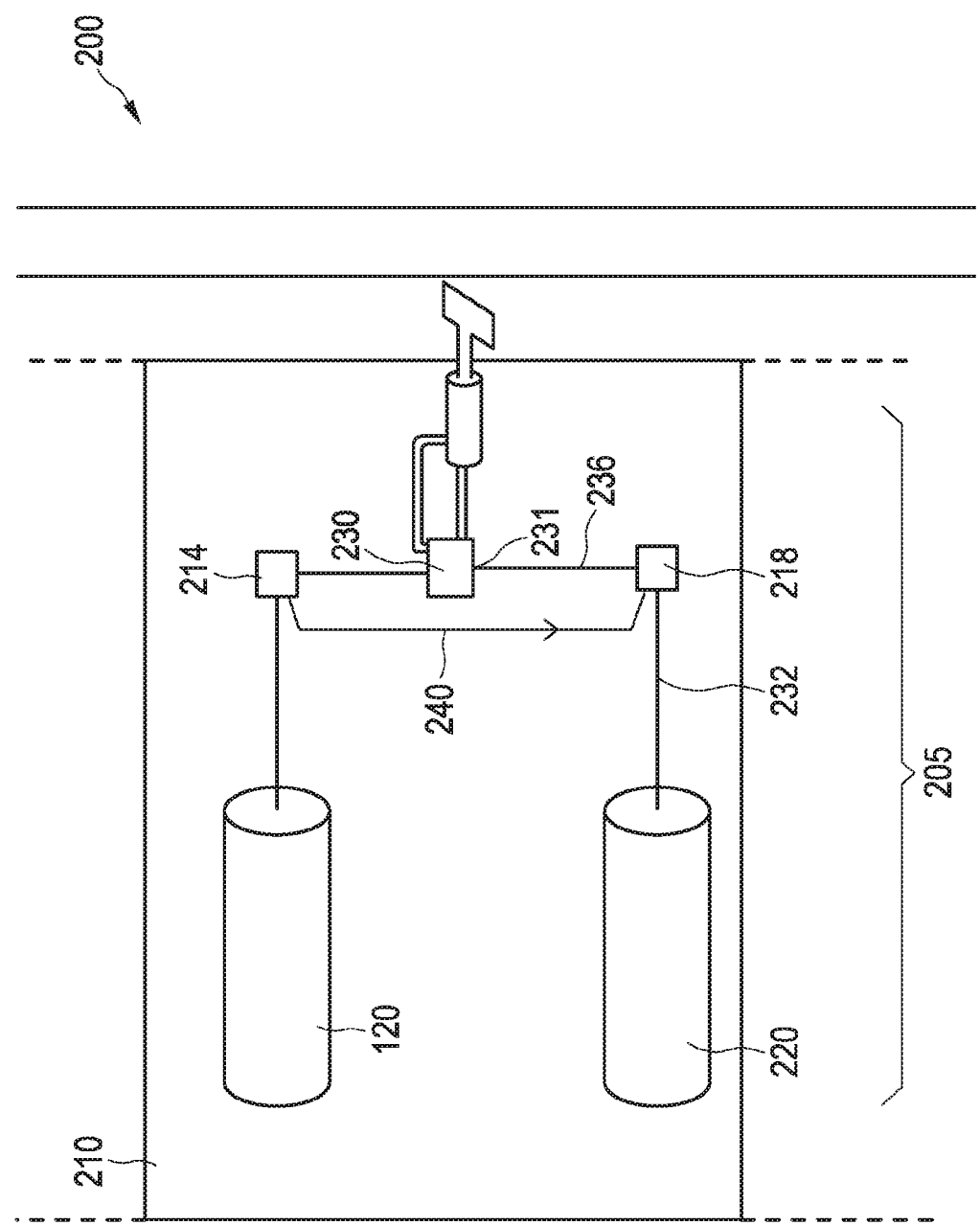
FIG. 2 is a second example embodiment of the blowout preventer stack according to the invention having an independent energy storage and drive unit.

FIG. 2 shows a second example embodiment of the blowout preventer stack 200 according to the invention having an independent energy storage and drive unit 205.

Apart from the presence of a second kinetic energy storage device 220 and a corresponding second connection 231 of the hydraulic pump 230, the blowout preventer 210 comprised by the blowout preventer stack 200 corresponds to the blowout preventer 110 shown in FIG. 1.

The kinetic energy storage device 120 is coupled, or couplable, to the hydraulic pump 230 via a first coupling control unit 214, whereas the second kinetic energy storage device 220 is coupled, or couplable, to the hydraulic pump 230 via a second coupling control unit 218. In the present example embodiment, the first coupling control unit 214 is configured to transmit an electric signal 240 to the second coupling control unit 218 in predetermined time intervals and the second coupling control unit 218 is configured to receive said electric signal 240. In addition, the second coupling control unit is configured not to couple a fourth shaft 236, which is connected to the hydraulic pump 230, to the third shaft 232, which is connected to the second kinetic energy storage device 220, as long as the electric signal 240 is being received. If no electric signal 240 is received any more, the second coupling control unit 218 is configured to switch to the coupled condition in which the second kinetic energy storage device 220 is coupled to the hydraulic pump 230. This makes it possible for the hydraulic pump 230 to be driven even if the kinetic energy storage device 120 is damaged, which is indicated by the absence of the electric signal 240. In a further non-illustrated example embodiment, the blowout preventer is configured such that a plurality of kinetic energy storage devices may drive the hydraulic pump at the same time.

In a non-illustrated example embodiment, a kinetic energy storage device of a blowout preventer is configured to transmit kinetic energy to other kinetic energy storage devices or receive kinetic energy therefrom. This may be realised via a mechanical or electric connection between two kinetic energy storage devices.

Figure 3:
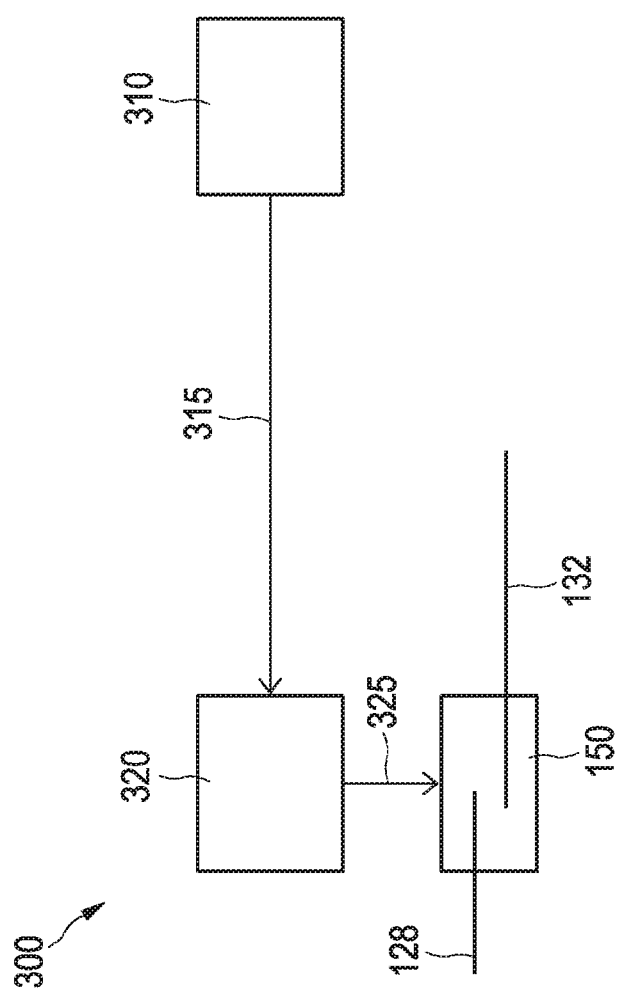
FIG. 3 is a signal structure for driving the blowout preventer stack according to the invention.

FIG. 3 shows a signal structure 300 for driving the blowout preventer stack according to the invention.

The signal structure 300 shows the interaction between the force and/or position sensor 310, the control unit 320 and the coupling control unit 150 of FIG. 1.

The force and/or position sensor 310 is configured to measure current data concerning a force applied to the force and/or position sensor 310 and/or the position thereof, and to output them as force and/or position data 315 to the control unit 320.

The control unit 320 is configured to receive force and/or position data 315 and to determine whether the measurement values indicated in said force and/or position data 315 for the applied forces and/or for the current position deviate by more than a predetermined amount from predetermined values for such data. If a sufficiently great deviation is determined by the control unit 320, said control unit 320 is further configured to output the case-of-need signal 325 to the coupling control unit 150, thus indicating the occurrence of a case of need.

In alternative example embodiments, which are not shown, the force and/or position sensor is configured to establish a comparison with predetermined values for the force and/or position data and, based thereon, to detect whether or not the case of need has occurred.

In another alternative example embodiment, the presence of the case of need is detected via a corresponding user input causing the coupling control unit to switch to the coupled condition.

The coupling control unit may also be realised within the hydraulic pump or within the kinetic energy storage device, such that in some example embodiments according to the invention there is no need for a second shaft to couple the kinetic energy storage device to the hydraulic pump.

Figure 4:
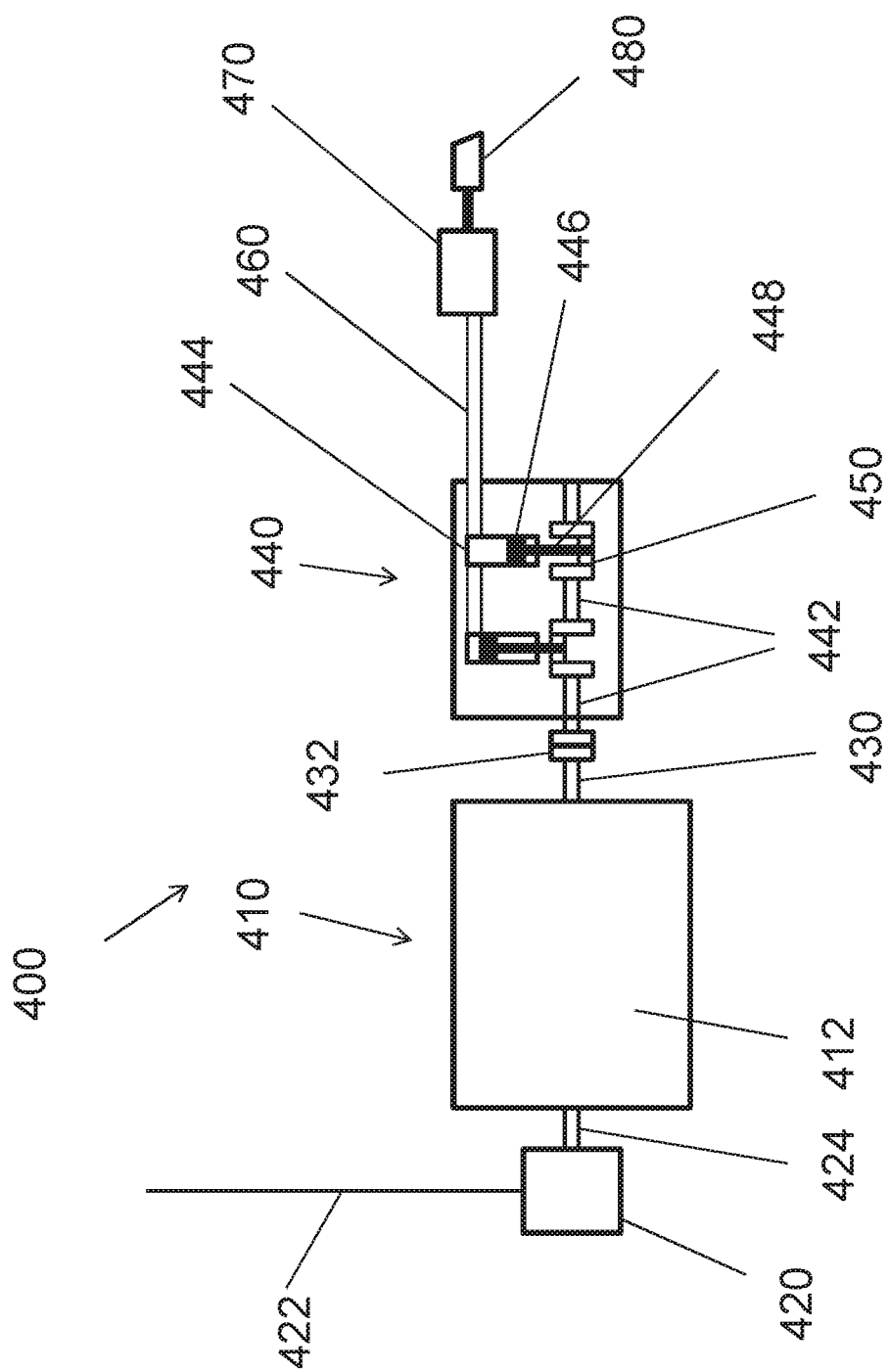
FIG. 4 is an embodiment variant of a blowout preventer unit having a hydraulic pump in the form of a plunger pump with an adjustable plunger stroke.

FIG. 4 shows a blowout preventer 400 having a kinetic energy storage device 410. As in the preceding example embodiments, the kinetic energy storage device is a flywheel mass storage device wherein a flywheel mass 412 is rotated at a high speed. In order to impart a high rotational speed to the flywheel mass 412, a drive mechanism 420, such as an electric engine, is provided which is supplied with energy, for example electric energy, via a supply line 422 and which is connected to the flywheel mass storage device 410 via a shaft 424. The flywheel mass storage device 410 may provide the kinetic energy stored therein even if the drive mechanism 420 is no longer energised via the supply line 422.

The flywheel mass storage device 410 is mechanically connected to a hydraulic pump 440. In the illustrated example embodiment, an output shaft 430 of the kinetic energy storage device 410 is connected to a crankshaft 442 of the hydraulic pump 440 via a disconnectable mechanical coupling 432. As illustrated below, the mechanical coupling 432 is not necessarily required. In the illustrated example embodiment, the hydraulic pump 440 is a plunger pump having two cylinders 444 wherein pistons 446 perform reciprocating movements in order to pump hydraulic oil through a hydraulic line 460. The pistons 446 are each connected in a known manner, via a respective connecting rod 448, to the eccentrics 450 of the crankshaft 442. The hydraulic pump 440 is connected, via the hydraulic line 460, to a hydraulic actuator 470 which can drive a shear ram 480 or another type of ram of a blowout preventer.

Figure 5:
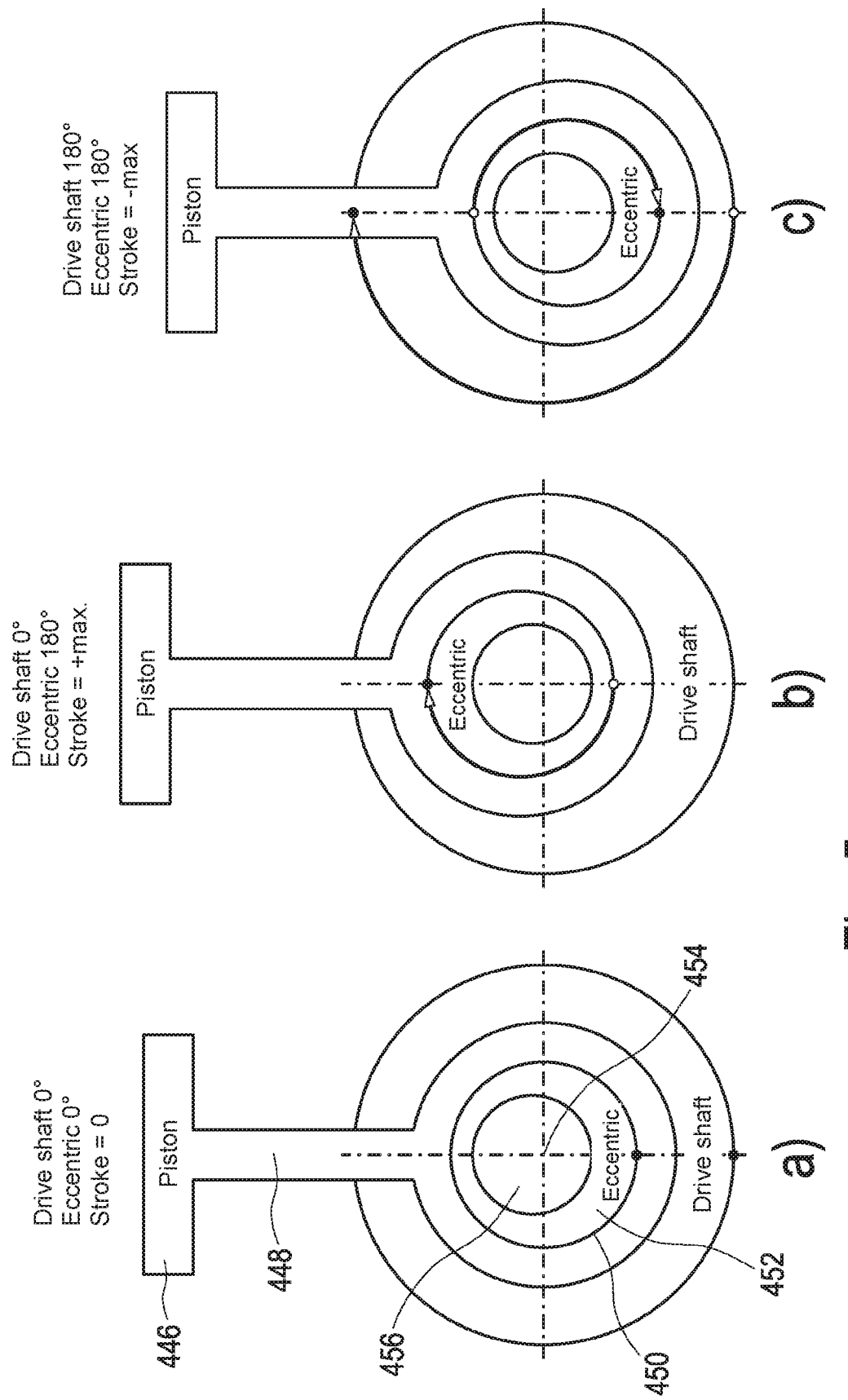
FIGS. 5a to 5c are possible realisations of an adjustable plunger stroke.

FIGS. 5*a* to 5*c* show that the stroke or degree of eccentricity of the eccentric 450 is adjustable, such that the stroke of the piston 446 is continuously adjustable between a minimum corresponding to 0 and a maximum stroke.

The position of the eccentric—and thus the stroke of the hydraulic pump—may be adjusted by rotating an eccentric cylinder 452.

The position of the eccentric may be adjusted by rotating an eccentric cylinder 452. The eccentric cylinder 452 is inserted into a crankshaft cylinder 456 of the crankshaft 442 in such a manner that an eccentric 450, which protrudes from the eccentric cylinder 452 and to which the connecting rod 448 is fastened, changes its position with respect to an axis of rotation 454 of the crankshaft 442 when the eccentric cylinder 452 is rotated about its eccentric axis.

FIGS. 5*a* to 5*c* illustrate the way in which an adjustable piston stroke may be achieved with a hydraulic pump 440.

The crankshaft 442 has a crankshaft cylinder 456 which is arranged eccentrically with respect to the axis of rotation 454 of the crankshaft 442 and on which the eccentric 450 is fastened via an eccentric cylinder 452 provided with an adjustable angle of rotation. The eccentric 450 has an outer surface on which the connecting rod 448 is applied. This outer surface is a cylindrical lateral surface. The eccentric cylinder 452 is arranged eccentrically with respect to this cylindrical lateral surface and forms a cylinder-shaped inner surface. This cylinder-shaped inner surface surrounds a cylindrical outer surface of the crankshaft cylinder 456 and abuts thereon.

FIG. 5a shows the first position of the eccentric, in which the eccentric 450 is coaxial with the axis of rotation 454, such that the connecting rod 448 does not cause any stroke movement when the crankshaft 442 rotates about the axis of rotation 454. Therefore, the connecting rod 448 which is connected to the piston 446 will not be driven and will not pump any hydraulic fluid to the hydraulic actuator.

FIG. 5b, on the other hand, shows the second position of the eccentric, in which the eccentric 450 is at a distance from the axis of rotation 454, such that the connecting rod 448 will move and a piston of the hydraulic pump, which is respectively connected to the corresponding connecting rod 448, will pump hydraulic fluid when the crankshaft 442 is in rotation.

By rotating the eccentric cylinder 452 about the crankshaft cylinder 458, it is thus possible to control the amount of the hydraulic fluid pumped by the hydraulic pump to the hydraulic actuator and, consequently, to control the drive mechanism of the blowout preventer.

In the position of the eccentric 450 relative to the crankshaft cylinder 458 as shown in FIG. 5a, the centre of the eccentric 450 coincides with the axis of rotation 454 of the crankshaft 442, such that although the crankshaft 442 is in rotation, no stroke movement is imparted onto the connecting rod 448 and piston 446. On the contrary, FIGS. 5b and 5c show the way in which a maximum stroke movement can be set by appropriately changing the rotational position of the eccentric 450 with respect to the crankshaft cylinder 456. FIG. 5b shows the top dead centre of the piston 446 and FIG. 5c shows the bottom dead centre of the piston 446. By changing the position of the eccentric 450 or the eccentric cylinder 452 with respect to the eccentrically arranged crankshaft cylinder 456, the stroke of the piston 446, and thus the pumping capacity of the hydraulic pump 440, may be continuously adjusted. This makes it possible to dispense with a mechanical coupling 432 and instead control the amount of hydraulic oil delivered by the hydraulic pump 440 solely via the degree of eccentricity of the outer surface of the eccentric 450.

REFERENCE SIGNS

100, 200 blowout preventer stack
105, 205 independent energy storage and drive unit
110, 210 blowout preventer
120 kinetic energy storage device
122 flywheel mass
128 shaft
130, 230 hydraulic pump
132 second shaft
136 hydraulic fluid
138a, 138b hydraulic line
140 hydraulic actuator
144 slide gate valve
148 shear ram
150 coupling control unit
160 drill pipe
214 first coupling control unit
218 second coupling control unit
220 second kinetic energy storage device
231 second connection
232 third shaft
236 fourth shaft
240 electric signal
300 signal structure
310 force and/or position sensor
315 force and/or position data
320 control unit
325 case-of-need signal 325
400 blowout preventer
410 kinetic energy storage device/flywheel mass storage device
412 flywheel mass
420 drive mechanism
422 supply line
424 shaft
430 output shaft
432 mechanical coupling
440 hydraulic pump
442 crankshaft
444 cylinder
446 piston
448 connecting rod
450 eccentric
452 eccentric cylinder
454 axis of rotation
456 crankshaft cylinder
460 hydraulic line
470 hydraulic actuator
480 shear ram

What is claimed is:

1. A blowout preventer stack having at least one blowout preventer, at least one kinetic energy storage device, and at least one hydraulic actuator which is disposed outside the kinetic energy storage device and is connected to a hydraulic pump via a hydraulic line and is mechanically connected to the blowout preventer,
   wherein the kinetic energy storage device is coupled, or couplable, to the hydraulic pump and the hydraulic pump may be driven by the kinetic energy stored in the kinetic energy storage device in such a manner that in case of need the hydraulic pump will pump hydraulic fluid to the hydraulic actuator and thus actuate the blowout preventer.

2. The blowout preventer stack as claimed in claim 1, wherein the kinetic energy storage device is mechanically coupled, or couplable, to the hydraulic pump.

3. The blowout preventer stack as claimed in claim 1, wherein in case of need the hydraulic actuator is configured to actuate a slide gate valve of the blowout preventer.

4. The blowout preventer stack as claimed in claim 1, wherein the hydraulic actuator is mechanically coupled to a shear ram of the blowout preventer.

5. The blowout preventer stack as claimed in claim 1, wherein the hydraulic actuator is a hydraulic cylinder.

6. The blowout preventer stack as claimed in claim 1, wherein the kinetic energy storage device comprises a flywheel mass which is configured and arranged so as to rotate with high speed.

7. The blowout preventer stack as claimed in claim 1, wherein the hydraulic pump and the hydraulic line are arranged outside the kinetic energy storage device.

8. The blowout preventer stack as claimed in claim 1, wherein the kinetic energy storage device is coupled, or couplable, to the hydraulic pump via a shaft.

9. The blowout preventer stack as claimed in claim 1, having a coupling control unit, wherein the coupling control unit is configured to switch, in case of need, from a decoupled condition, in which the kinetic energy storage device is not coupled to the hydraulic pump, to a coupled condition, in which the kinetic energy storage device is coupled to the hydraulic pump.

10. The blowout preventer stack as claimed in claim 1, wherein the kinetic energy storage device is further configured to transmit kinetic energy to other kinetic energy storage devices or receive kinetic energy therefrom.

11. The blowout preventer stack as claimed in claim 1, wherein the blowout preventer comprises a force and/or position sensor configured to measure force and/or position data and to provide these in the form of a data signal.

12. The blowout preventer stack as claimed in claim 1, further including a control unit configured to detect a presence, or absence, of said case of need and, if required, to trigger an operation of the hydraulic pump by means of the stored kinetic energy.

13. The blowout preventer stack as claimed in claim 1, having at least one further kinetic energy storage device, wherein said further kinetic energy storage device is coupled, or couplable, to the at least one hydraulic pump.

14. The blowout preventer stack as claimed in claim 1, wherein the at least one blowout preventer is an annular blowout preventer, a pipe ram blowout preventer or a shear ram blowout preventer.

15. The blowout preventer stack as claimed in claim 1, having an upper annular blowout preventer, a riser connector, a lower annular blowout preventer, a shear ram blowout preventer, a pipe ram blowout preventer, and a wellhead connector.

16. The blowout preventer stack as claimed in claim 1, wherein the hydraulic pump is a plunger pump with an adjustable plunger stroke and an adjustable delivery line.

17. The blowout preventer stack as claimed in claim 16, wherein the hydraulic pump has a connecting rod fastened to an eccentric of a crankshaft for operating a plunger of a plunger pump, the degree of eccentricity of the eccentric being adjustable in relation to the axis of rotation of the crankshaft.

18. An independent energy storage and drive unit for a blowout preventer, having at least one kinetic energy storage device, at least one hydraulic pump, and at least one hydraulic actuator which is disposed outside the kinetic energy storage device and is connected to the hydraulic pump via a hydraulic line,
    wherein the kinetic energy storage device is coupled, or couplable, to the hydraulic pump and the hydraulic pump may be driven by the kinetic energy stored in the kinetic energy storage device in such a manner that in case of need the hydraulic pump will pump hydraulic fluid to the hydraulic actuator.

\* \* \* \* \*